United States Patent
Saito

(10) Patent No.: US 7,570,592 B2
(45) Date of Patent: Aug. 4, 2009

(54) DATA TRANSFER DEVICE FOR EXECUTING THE PROCESS DISCARDING ERROR FRAME

(75) Inventor: Masahiro Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/084,613

(22) Filed: Mar. 18, 2005

(65) Prior Publication Data

US 2005/0163051 A1    Jul. 28, 2005

Related U.S. Application Data

(63) Continuation of application No. PCT/JP03/00653, filed on Jan. 24, 2003.

(51) Int. Cl.
 G01R 31/08    (2006.01)
 H04L 12/28    (2006.01)
 G06F 11/00    (2006.01)
(52) U.S. Cl. .................. 370/236; 370/392; 714/52
(58) Field of Classification Search .......... 370/229, 370/230, 235, 236, 236.1, 236.2, 351, 389, 370/392, 401
See application file for complete search history.

(56) References Cited

U.S. PATENT DOCUMENTS

| | | | |
|---|---|---|---|
| 5,513,172 A | * | 4/1996 | Shikama et al. ............. 370/428 |
| 5,521,913 A | * | 5/1996 | Gridley ....................... 370/389 |
| 5,598,581 A | | 1/1997 | Daines et al. |
| 6,449,255 B1 | * | 9/2002 | Waclawsky ................. 370/236 |
| 6,483,857 B1 | * | 11/2002 | Sloan et al. .................. 370/522 |
| 6,539,020 B1 | * | 3/2003 | Barber et al. ............... 370/401 |
| 6,907,040 B2 | * | 6/2005 | Matsuzawa .................. 370/401 |
| 2002/0087716 A1 | * | 7/2002 | Mustafa ....................... 709/236 |
| 2004/0103218 A1 | * | 5/2004 | Blumrich et al. ............ 709/249 |
| 2005/0175006 A1 | * | 8/2005 | Miyazaki et al. ............ 370/389 |

FOREIGN PATENT DOCUMENTS

| | | | |
|---|---|---|---|
| JP | 9-149068 | | 6/1997 |
| JP | 9-162917 | | 6/1997 |
| JP | 09-186712 | * | 7/1997 |
| JP | 9-186712 | | 7/1997 |
| JP | 2000-196644 | | 7/2000 |
| JP | 2000-316034 | | 11/2000 |

* cited by examiner

*Primary Examiner*—Seema S Rao
*Assistant Examiner*—Christine Duong
(74) *Attorney, Agent, or Firm*—Katten Muchin Rosenman LLP

(57) ABSTRACT

A data transmission apparatus and a data transmission method for receiving an input of control frame and a data frame, transmitting or discarding the data frame according to the control frame input, outputting the control frame, and outputting the data frame which has been transmitted. This enables discarding of an error frame in the middle of transmission, thereby preventing waste of a band on the network or the waste of the destination host processing ability by the error frame.

20 Claims, 12 Drawing Sheets

DATA TRANSFER DEVICE FOR EXECUTING THE PROCESS DISCARDING ERROR FRAME

CROSS-REFERENCE TO RELATED APPLICATION

This application is a continuation of International Application PCT/JP03/00653, filed on Jan. 24, 2003, the contents of which are herein wholly incorporated by reference.

BACKGROUND OF THE INVENTION

The present invention relates to a data transfer device such as a switching hub, etc. for transferring data across a network such as Ethernet, etc.

A frame transfer method in the Ethernet (registered trademark) can be roughly classified into two methods. One method is a store-and-forward method, and the other is a cut-through method.

In the case of the store-and-forward method, the data transfer device temporarily stores a memory with all of received frames and transmit the frame to a next device.

On the other hand, in the case of the cut-through method, the data transfer device executes a process of determining a device to which the frame should be transferred (forwarded) next at a point of time when receiving MAC DA (Media Access Control Destination Address) contained in the frame, and starts transferring the frame if transferable at a point of time when determining the transfer target device (refer to Patent document 1, paragraphs 0002-0006).

In comparison between these two methods, generally the cut-through method has a shorter period of time required for transferring the frame within the device, i.e., a smaller process delay and is therefore superior.

In the conventional cut-through method, however, there arises a problem, wherein if an error occurs in the frame, as will be explained later on, the error frame wastes bands of communication paths, and so on. Therefore, the store-and-forward method was adopted in some cases at the cost of the processing delay.

For instance, the Ethernet has a mechanism capable of judging from 4-byte FCS (Frame Check Sequence) attached to a tail of the frame whether the received frame is broken or not.

Therefore, when transmitting the frame, an FCS calculation is performed while transmitting the data, and the frame is sent in a way that attaches the FCS to the tail of the frame. When receiving the frame, the FCS calculation is performed while receiving the frame, and, at a point of time when receiving the whole frame, it is judged whether the data is broken or not by making a comparison with the FCS transmitted while being attached to the frame.

If a line quality on the network declines, the error occurs in the frame. In the cut-through method, each of the devices can detect the error, however, the frame transmission to a rear-stage device has already started just when detecting the error, and hence it follows that this error frame wastes the bands on the network. Moreover, a host serving as a frame destination executes a discard process of discarding the error frame, so that a throughput of the destination host is waste.

On the other hand, in the store-and-forward method, the frame is transmitted after temporarily storing the memory with the frame. Hence, the error-detected frame can be discarded by the device that detected the error. With this mechanism, futile traffic does not occur on the network, and a load of the frame discard process is not applied onto the destination host.

Such being the case, there is proposed a device including a mechanism for switching over to the cut-through method when an error occurrence frequency is small and to the store-and-forward method just when the number of errors exceeds a certain threshold value (it is judged that the line quality declines).

(Patent Document 1)
Japanese Patent Application Laid-Open Publication No. 2002-24723

SUMMARY OF THE INVENTION

The reason why the bands and the throughput of the destination host are wasted by the occurrence of the error frame in the cut-through method, is derived from the following two causes. It may be sufficient that one of these causes can be solved.

1. When detecting the error by use of the FCS, etc., the frame transmission to the rear-stage device has already started. Namely, the device that detected the error can not discard the frame.

2. There is no means for discarding the frame on the communication path up to the frame destination host.

The use of the store-and-forward method can obviate the former of the above causes, and hence the problem can be solved. Instead, however, there must be used a communication path exhibiting a large processing delay even when the error does not occur, and besides each of the devices requires a memory for accumulating the frames, resulting in a defect of increasing a cost for the device.

In the combination of the store-and-forward method and the cut-through method, the communication path exhibiting a small transmission delay can be provided by the cut-through method when the error does not occur (or when the error occurrence frequency is small), however, a problem is that the device architecture becomes complicated. Therefore, the cost for manufacturing the device rises.

The present invention, in view of the problems inherent in the prior arts, adopts the means for solving the latter of the causes given above by using the cut-through method. Namely, it is an object of the present invention to provide a transmission device and a transmission method that are capable of preventing a wasteful use of bands on a network due to an error frame or reducing a wasteful use of a throughput of a destination host by enabling the error frame to be discarded midways of being transmitted.

The present invention adopts the following means in order to accomplish the above object.

A data transfer device according to the present invention comprises an input unit accepting an input of a control frame and an input of a data frame, a processing unit executing a transfer process of the data frame or a discard process of the data frame on the basis of the control frame inputted from the input unit, and an output unit outputting the data frame subjected to the transfer process in the processing unit.

In the data transfer device, the control frame can be outputted to the outside from the output unit.

In the data transfer device, the processing unit may include a discard target storage module stored with information showing a discard target data frame, a management unit updating the information in the discard target storage module on the basis of the control frame, and a discard processing unit executing the discard process if the data frame proves to be a discard target by referring to the discard target storage module.

In the data transfer device, the processing unit may include an error detection unit detecting an error of the data frame, and if the data frame is an error frame containing an error, the error detection unit detects the error, assembles the control frame showing a purport that the error frame is to be discarded, and outputs the control frame to the outside from the output unit.

In the data transfer device, the management unit may search for the information registered in the discard target storage module and may, when judging that a content to be updated based on the control frame has already been registered, inhibit the information from being updated and the control frame from being outputted to the outside.

In the data transfer device, the information in the discard target storage module may be deleted after a predetermined period of time has elapsed.

In the data transfer device, the error detection unit may includes an error storage module recorded with, when detecting the error and outputting the control frame, information about this outputted control frame.

In the data transfer device, the processing unit, when updating the discard target storage module on the basis of the control frame, may search for the information registered in the error storage module and may, when judging that a content to be updated has already been registered, inhibit the information from being updated and the control frame from being outputted to the outside.

In the data transfer device, when the error detection unit detects an error, the discard target storage module may be searched through, and, when judging that the error-detected data frame has already been registered as a discard target, the error may be inhibited from being stored in the error storage module.

In the data transfer device, when the error detection unit detects an error, the discard target storage module may be searched through, and, when judging that the error-detected data frame has already been registered as a discard target, the information about the discard target may be deleted from the discard target storage module.

In the data transfer device, a process of outputting the control frame may be executed preferentially over a process of outputting the data frame.

In the data transfer device, the input unit may accept an input of the data frame and an input of the control frame from the same communication path, and the output unit may output the data frame and the control frame to the communication path.

In the data transfer device, when the input unit accepts an input of the data frame and an input of the control frame respectively from the communication paths different from each other and when the output unit outputs the data frame and the control frame respectively to the communication paths different from each other, a speed of the communication path for the control frame may be set higher than that of the communication path for the data frame.

In the data transfer device, the processing unit may start outputting the data frame before reading the whole data frame.

Moreover, a data transfer method executed by an information processing device according to the present invention, comprises a step of accepting an input of a control frame, a step of accepting an input of a data frame, a step of executing a transfer process of the data frame or a discard process of the data frame on the basis of inputted the control frame, a step of outputting the control frame, and a step of outputting the data frame subjected to the transfer process.

The data transfer method may further comprise a step of executing the discard process of, if the data frame proves to be a discard target by referring to discard target storage module stored with a discard target data frame, discarding this data frame.

The data transfer method may further comprise a step of detecting an error of the data frame, and a step of assembling, if the data frame is an error frame containing an error, the control frame showing a purport that the error frame is to be discarded.

The data transfer method may further comprise a step of searching for the information registered in the discard target storage module and, when a content to be updated based on the control frame has already been registered, inhibiting the information from being updated and the control frame from being outputted to the outside.

The data transfer method may further comprise a step of deleting the information in the discard target storage module after a predetermined period of time has elapsed.

The data transfer method may further comprise a step of storing, when detecting the error and outputting the control frame, an error storage module with information about this outputted control frame.

In the data transfer method, when updating the discard target storage module on the basis of the control frame, the information registered in the error storage module may be searched for, and when judging that a content to be updated has already been registered, the updating of the information and the outputting of the control frame to the outside may be inhibited.

In the data transfer method, when detecting an error, the discard target storage module may be searched through, and when judging that the error-detected data frame has already been registered as a discard target, the error may be inhibited from being stored in the error storage module.

In the data transfer method, when detecting an error, the discard target storage module may be searched through, and when judging that the error-detected data frame has already been registered as a discard target, the information about the discard target may be deleted from the discard target storage module.

In the data transfer method, a process of outputting the control frame may be executed preferentially over a process of outputting the data frame.

In the data transfer method, the output of the data frame may be started before reading the whole data frame.

Note that the configurations described above can be combined to the greatest possible degree.

With these configurations, according to the present invention, when transferring the data by the cut-through method, each of the data transfer devices building up the communication paths executes the discard process of discarding the error-occurred data frame (error frame) on the basis of the control frame, thereby enabling the error frame to be discarded midways of being transmitted and a wasteful use of the bands of the communication paths to be prevented or a wasteful use of the throughput of the destination host to be reduced.

DETAILED DESCRIPTION OF THE INVENTION

Embodiments of the present invention will hereinafter be described with reference to the drawings. Configurations in the embodiments are exemplifications, and the present invention is not limited to the configurations in the embodiments.

First Embodiment

Figure 1:
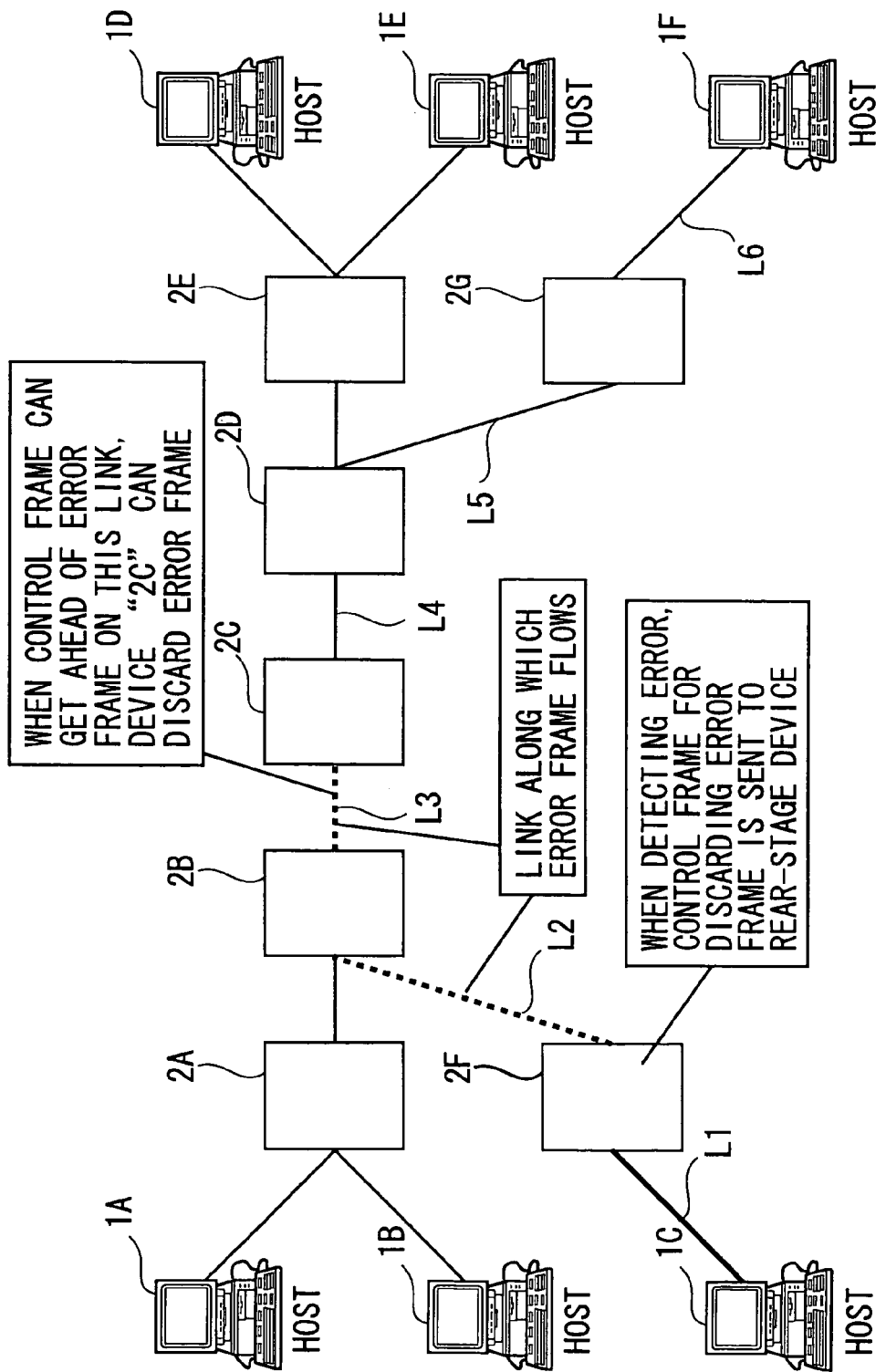
FIG. 1 is a view showing a network architecture in a first embodiment.

FIG. 1 is a block diagram showing a network architecture adopting a switch hub (corresponding to a data transfer device) by way of one embodiment of the present invention.

In the network according to the first embodiment, a plurality of hosts 1A through 1F are connected via a plurality of switching hubs 2A through 2G.

<Whole Configuration of Data Transfer Device>

Figure 2:
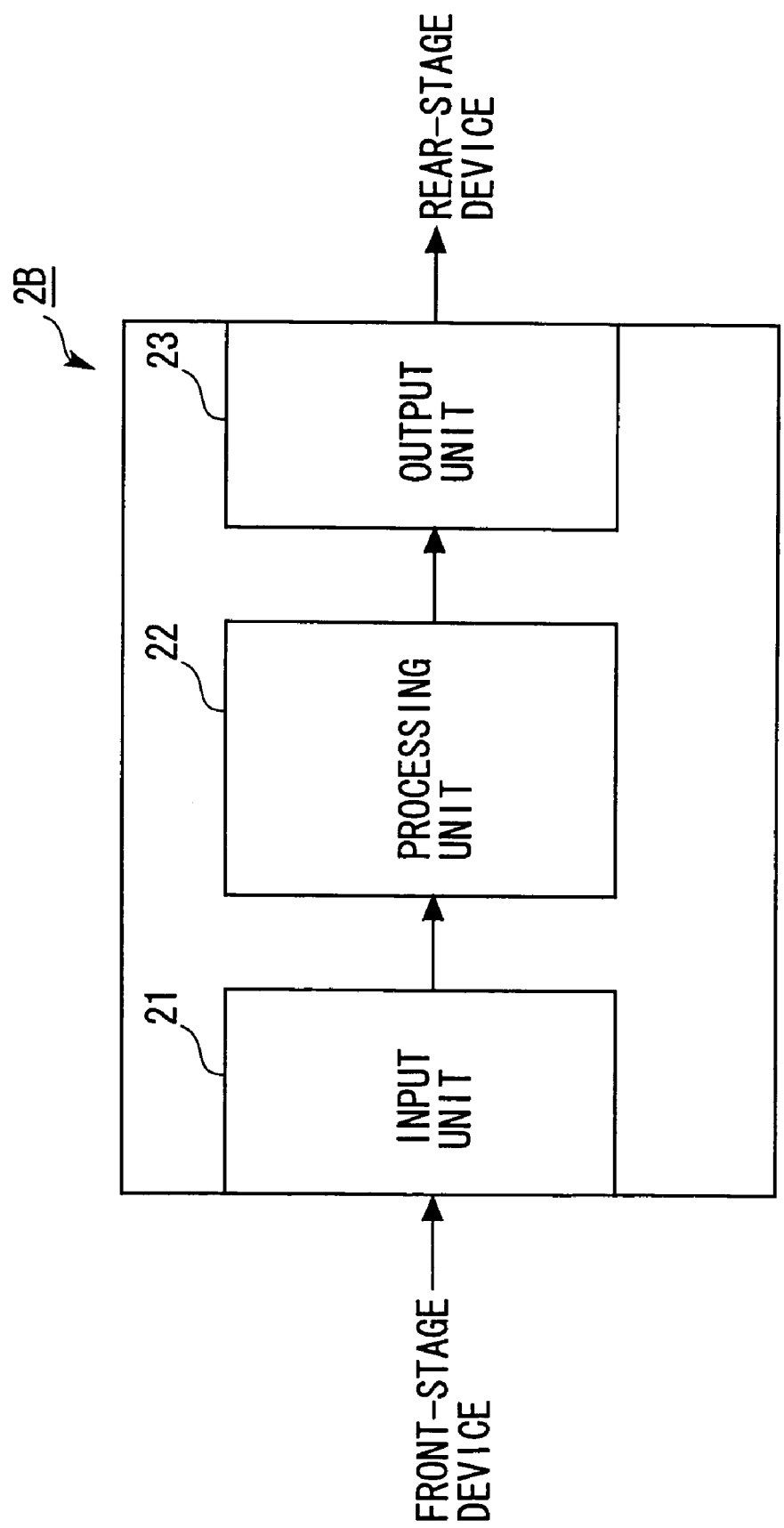
FIG. 2 is a diagram showing a whole configuration of a data transmission device.

FIG. 2 shows a whole configuration of a switching hub 2A according to the present invention.

As shown in FIG. 2, the switching hub 2B in the first embodiment is constructed of an input unit 21, a processing unit 22 and an output unit 23, wherein the data are transferred by a cut-through method.

The input unit 21 accepts a data frame and a control frame that are outputted from a device (which is the switching hub 2F in this example) at a front stage, and outputs, after converting the data frames into a format processable by the processing unit 22, these converted frames to the processing unit 22.

The processing unit 22 executes, based on the received control frame, a data frame transfer process or a data frame discard process.

Further, the output unit 23 outputs, after converting the data frame and the control frame subjected to the transfer process in the processing unit 22 into a format for transmission, these converted frames to a device (which is a switching hub 2C).

Thus, the switching hub in the first embodiment is capable of discarding the data frame from which an error is detected based on the control frame, while transferring the data frame by the cut-through method.

For example, in the case of transmitting the data frame to the host 1F from the host 1C in FIG. 1, if an error occurs on a communication path L1, the switching hub 2F transfers the data frame to the hub 2B at the rear stage, and simultaneously detects the error and output the control frame.

The switching hub 2B further transfers the data frame and the control frame sent from the hub 2F at the front stage. At this time, the switching hub 2B outputs preferentially the control frame over the data frame as will be explained later on.

Then, the switching hub 2C executes, based on this control frame, a discard process of discarding the data frame in which the error occurs.

With this contrivance (scheme), the switching hubs 2A-2F can discard the error frame midways of the transfer, thereby causing none of futile traffic on the subsequent communication paths L4 through L6 and preventing the destination host 1F from having a load of deleting the error frame.

(Configuration of Processing Unit>

Figure 3:
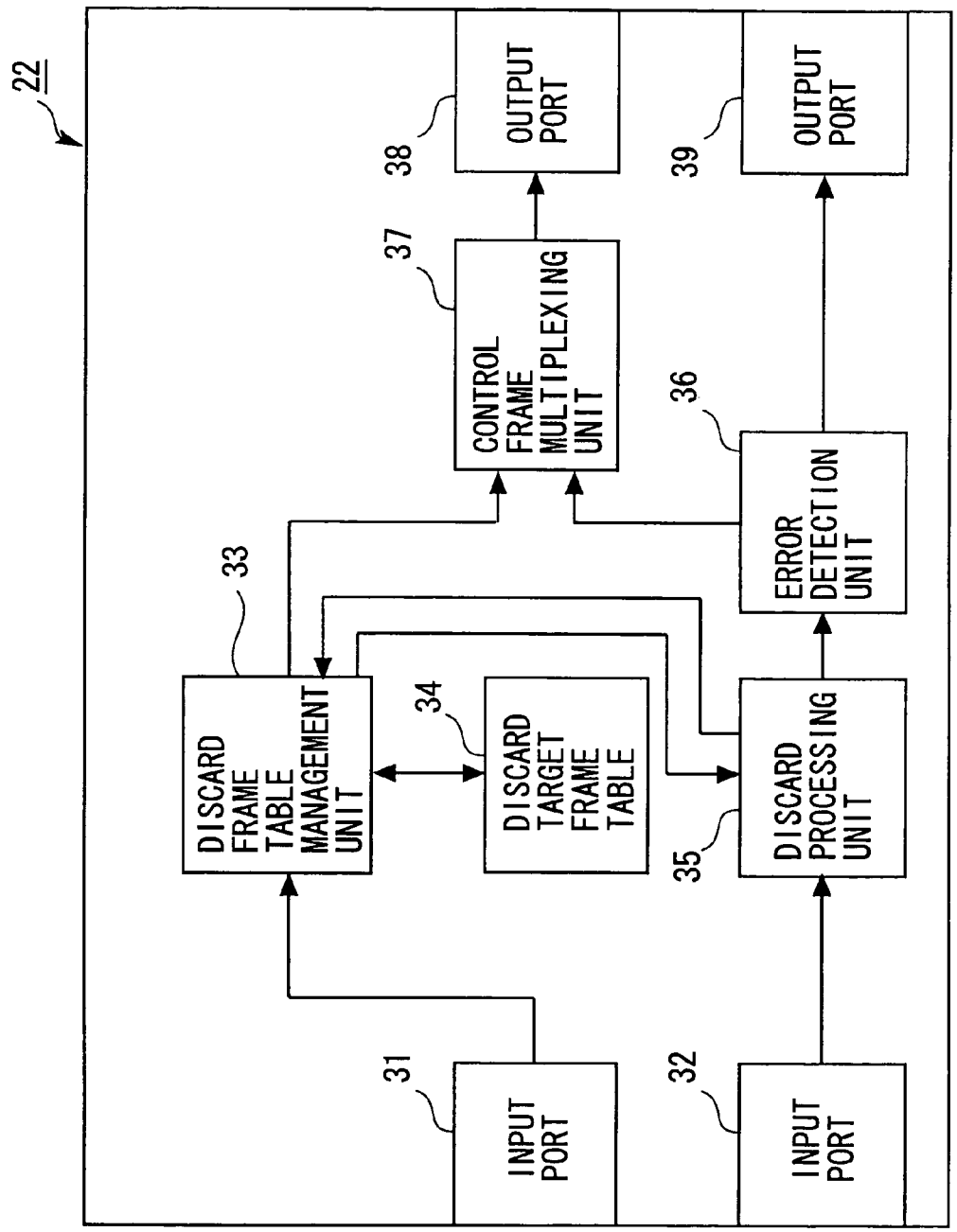
FIG. 3 is a diagram showing a basic configuration of a processing unit.

FIG. 3 is a block diagram showing a configuration of the processing unit 22.

The processing unit 22 of the present invention includes an input port 31 for the control frame, an input port 32 for the data frame, a table management unit (corresponding to a management unit) 33, a discard target table (corresponding to a discard target storage module) 34, a discard processing unit 35, an error detection unit 36, a control frame multiplexing unit 37, an output port 38 for the control frame, and an output port 39 for the data frame.

The control frame and the data frame are inputted respectively to the input ports 31, 32 from the input unit 21. The control frame in the first embodiment has an address field indicating a destination, a control field showing control information, and an information field representing information of a control target, etc. Further, the data frame in the first embodiment has an address field indicating the destination, an identifying information field (an identification number) that makes the frame identifiable within the network, an information field showing an actual content of the communication, and an FCS (Frame Check Sequence indicating a CRC (Cyclic Redundancy Check) bit string from the address field up to the information field.

The table management unit 33 writes, based on the received control frame, the identification number for identifying the discard target frame in the discard target table 34, thereby updating the table 34. Simultaneously with this, the table management unit 33 sends the control frame to the control frame multiplexing unit 37.

At this time, the table management unit 33, if the try-to-write identifying number has already been recorded in the discard target table, inhibits the process of updating the discard target table and the transmission to the control frame multiplexing unit in order not to execute to a duplicate (redundant) process.

Further, the table management unit 33, upon receiving the information (the identification number) of the discarded data frame from the discard processing unit 35, deletes the identification number associated with the discarded frame from the discard target table 34. Moreover, the table management unit 33 also deletes the identification number exhibiting an elapse of a predetermined period of time since this identification number was written in the discard target table 34.

The discard processing unit 35 searches through the discard target frame table in order to judge whether the received data frame is a discard target or not. Then, the discard processing unit 35, if the received data frame is judged to be the discard target, executes a process of deleting the data frame as the discard process and a process of notifying the table management unit 33 of a signal showing a purport that the data frame has been deleted. The discard processing unit 35, if the received data frame is judged not to be the discard target, transmits the data frame to the error detection unit 36.

The error detection unit 36 checks the received data frame from the address field to the information (data) field by the CRC method involving the use of the FCS (Frame Check Sequence). Further, the received data frame is sent as it is to the output unit 23 via the data frame output port 39. If an error is detected by this check, the error detection unit 36 assembles a control frame in which the information (data) field contains the identification number of this error-detected data frame and the control field contains a bit string indicating the discard so that this data frame is specified as the discard target, and sends this control frame to the control frame multiplexing unit 37.

The control frame multiplexing unit 37 multiplexes the control frame transferred from the table management unit 33 with the control frame assembled by the error detection unit 36, and sends this multiplexed control frame to the control frame output port 38.

The control frame received from the control frame multiplexing unit 37 is outputted via the control frame output port 38 outside the processing unit.

With the mechanism described above, in the present processing unit 22, it is possible to discard the data frame recorded on the discard target table 34 and to assemble the control frame for indicating the discard of the error-detected data from.

<Configuration of I/O Units>

Figure 4:
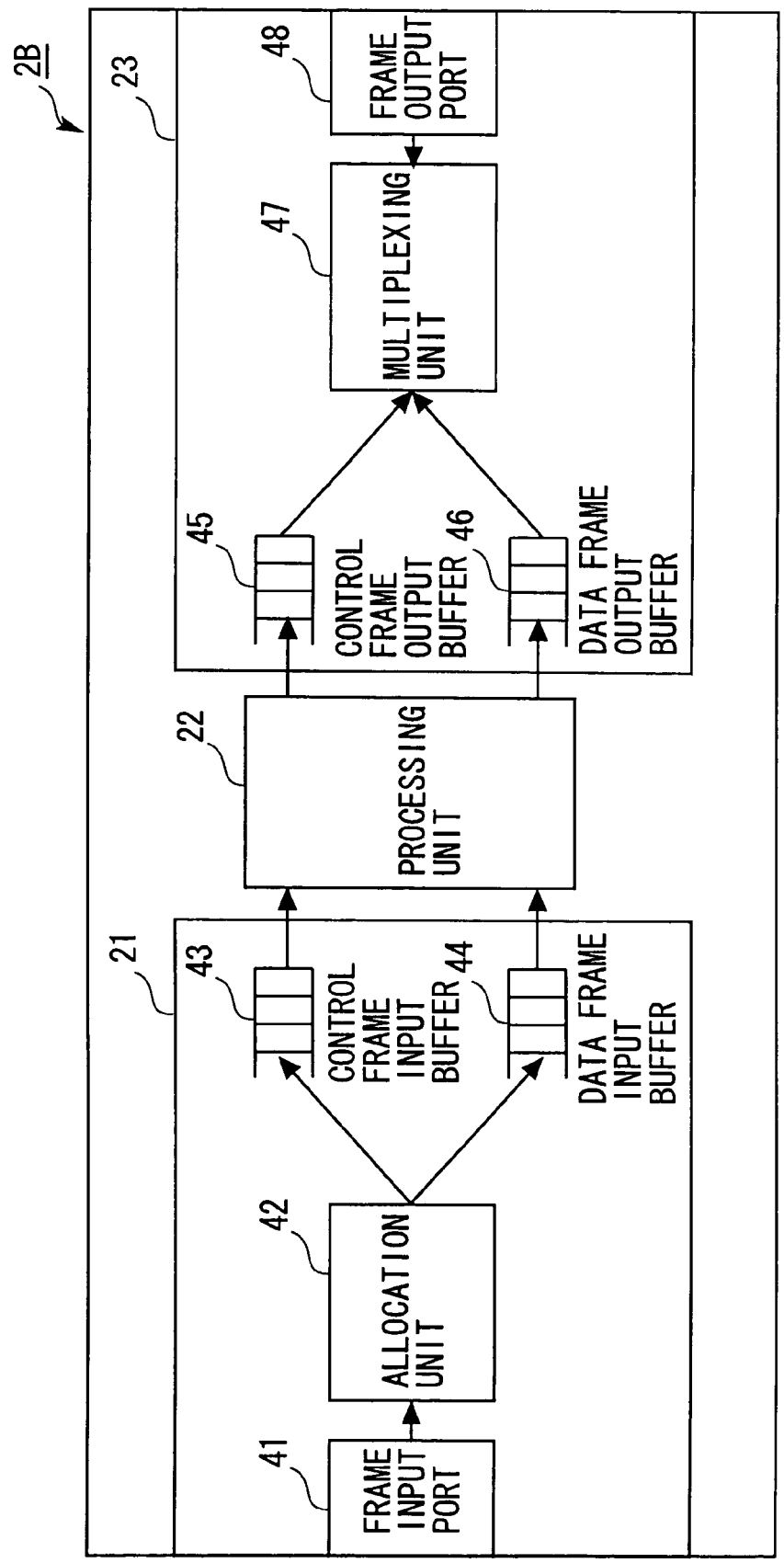
FIG. 4 is a diagram showing configurations of I/O units.

FIG. 4 is a block diagram showing configurations of the input unit 21 and of the output unit 23 in the first embodiment.

In the first embodiment, as described above, the control frame is assembled in the case of the error being detected, and is sent to the device at the rear stage, and the rear-stage device executes the discard process based on this control frame. It is therefore required that a speed of transferring the control frame to the rear stage device be faster than a speed of transferring the data frame to the rear stage device.

Hence, according to the first embodiment, within the device, in a case where a function of processing the data frame and a function of processing the control frame utilize the same resource (the same communication path), a contrivance is that the control frame is given a priority to use the resource. Similarly, the control frame is preferentially sent to the rear-stage device over the data frame.

In the input unit 21, the resource being allocated preferentially to the control frame, an allocation unit 42 classifies the frames inputted to the input port 41 from the front-stage device into the control frame and the data frame, and stores the control frame on an input buffer 43 and the data frame on an input buffer 44. Then, the control frame stored on the control frame input buffer 43 is given the priority to be inputted to the processing unit 22 over the data frame stored on the data frame input buffer 44.

Moreover, the output unit 23, the resource being allocated preferentially to the control frame, stores an output buffer 45 with the control frame outputted from the processing unit 22 and stores an output buffer 46 with the data frame outputted therefrom. The output unit 23 inputs, to a multiplexing unit 47, preferentially the control frame stored on the control frame output buffer 45 over the data frame stored on the data frame output buffer 46.

The frame multiplexed by the multiplexing unit 47 is outputted to the rear-stage device via a frame output port 48.

With this scheme, the control frame assembled when the error is detected is preferentially sent to the rear-stage device over the data frame, and the rear-stage device is instructed to execute the discard process of discarding the error-detected data frame.

<Data Transfer Procedure>

Figure 5:
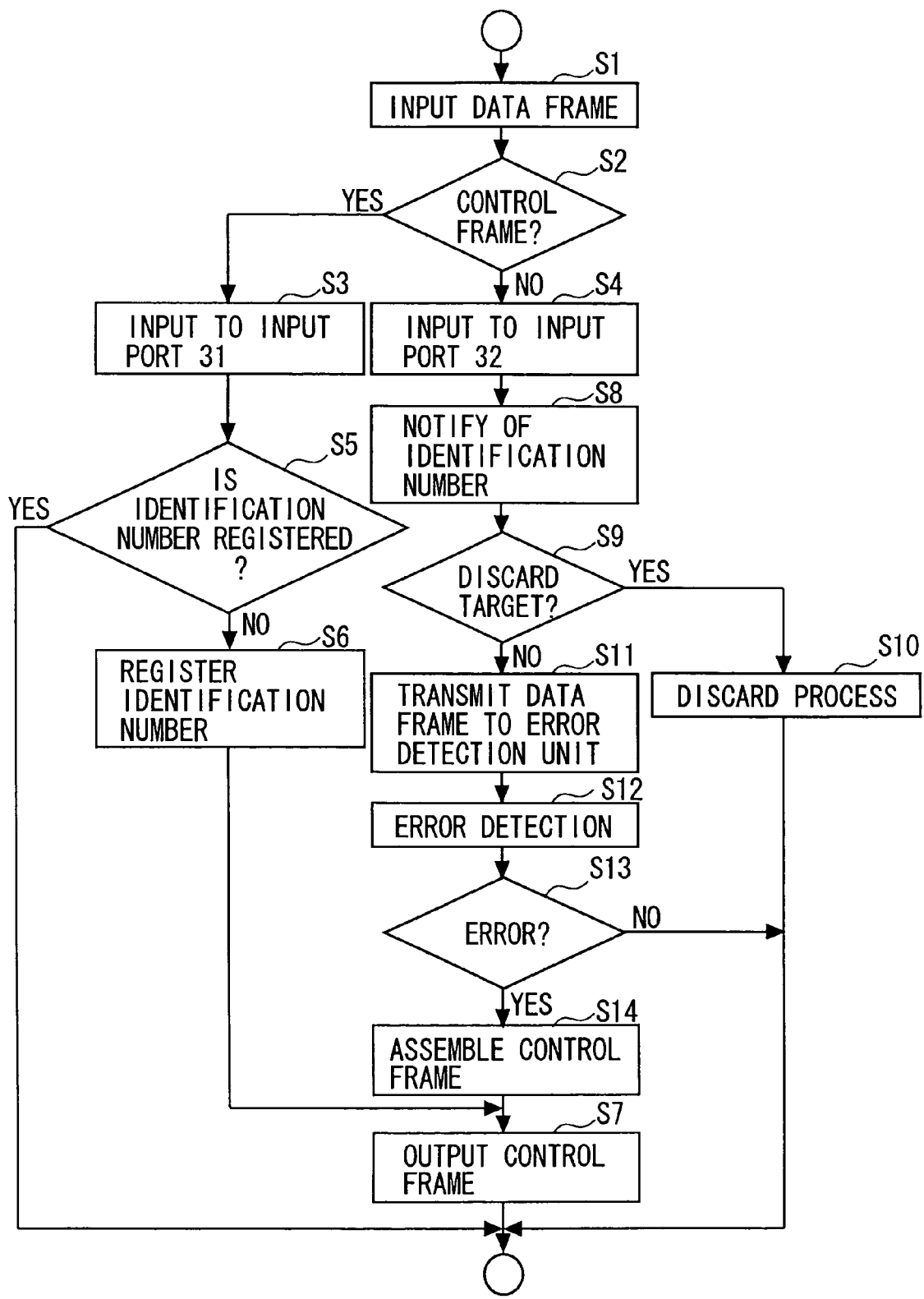
FIG. 5 is an explanatory diagram of a data transfer procedure.

FIG. 5 is an explanatory diagram of a data transfer procedure in the switching hub 2B in the first embodiment.

To begin with, the input unit 21 accepts the input of the control frame or the data from the front-stage device 2F (step 1, and the following steps will hereinafter be abbreviated to such as S1), then allocates the control frame and the data frame by use of the allocation unit 42 (S2), and inputs these frames to the input ports 31, 32 of the processing unit 22 (S3, S4).

When the control frame indicating the discard process is inputted, the table management unit 33 of the processing unit 22 searches through the discard target table 34, and thus judges whether the identification number specified by this control frame has already been registered in this table or not (S5). When judging that the identification number is not registered therein, this identification number is registered in the discard target table 34 (S6), and this control frame is outputted to the rear-stage device 2C via the control frame multiplexing unit 37, the output port 38 and the output unit 23 (S7). Note that if it is judged in step 5 that the identification number has already been registered, neither the transfer nor the registration of this control frame is done.

While on the other hand, when the data frame is inputted from the input unit 21, the discard processing unit 35 of the processing unit 22 notifies the table management unit 33 of the identification number of this data frame (S8). The table management unit 33 searches through the discard target table 34 and thus judges whether this data frame is a discard target or not (S9).

If judged to be the discard target, the discard processing unit 35 executes the discard process of discarding this discard target data frame (S10).

Whereas if judged not to be the discard target in step 9, the discard processing unit 35 transmits the data frame to the error detection unit 36 (S11).

The error detection unit 36 outputs the data frame to the rear-stage device 2C via the output port 39 and the output unit 23, and executes the error detection (S12). At this time, the processing unit 22 transfers the data frame by the cut-through method. Namely, the processing unit 22, after reading MAC DA (Media Access Control Destination Address) of the data frame, transfers the data frame to the rear-stage device 2C at a point of time before reading the whole frame.

Hereat, if the error is detected, the error detection unit 36 assembles the control frame indicating the discard process (S13, S14), and outputs the control frame to the rear-stage device 2C via the control frame multiplexing unit 37, the output port 38 and the output unit 23 (S7).

Thus, in the switching hub 2F (FIG. 1) in the first embodiment, the data frame is transferred by the cut-through method and is subjected to the error detection, and, if the error is detected, the control frame is assembled and transmitted to the rear-stage device. This rear-stage device (switching hub) 2B processes preferentially the control frame over the data frame, whereby the control frame gets ahead of the data frame midways of being transferred. The switching hub 2C receiving this control frame earlier executes the discard process of discarding the data frame received later based on this control frame.

Accordingly, the switching hub according to the first embodiment can execute the discard process of discarding the error frame midways of the transfer while transferring the data frame by the cut-through method.

With this scheme, it is possible to prevent a futile use of the bands on the network for the error frame and to reduce overspending of a throughput of the destination host.

For example, FIG. 1 shows the case in which the error frame occurred on the communication path L1 is transferred via the device 2F and the device 2B, and, at the point of time when outputted to the communication path L3, the control frame can get ahead of the error frame, whereby the error frame is discarded by the device 2C.

Figure 12:
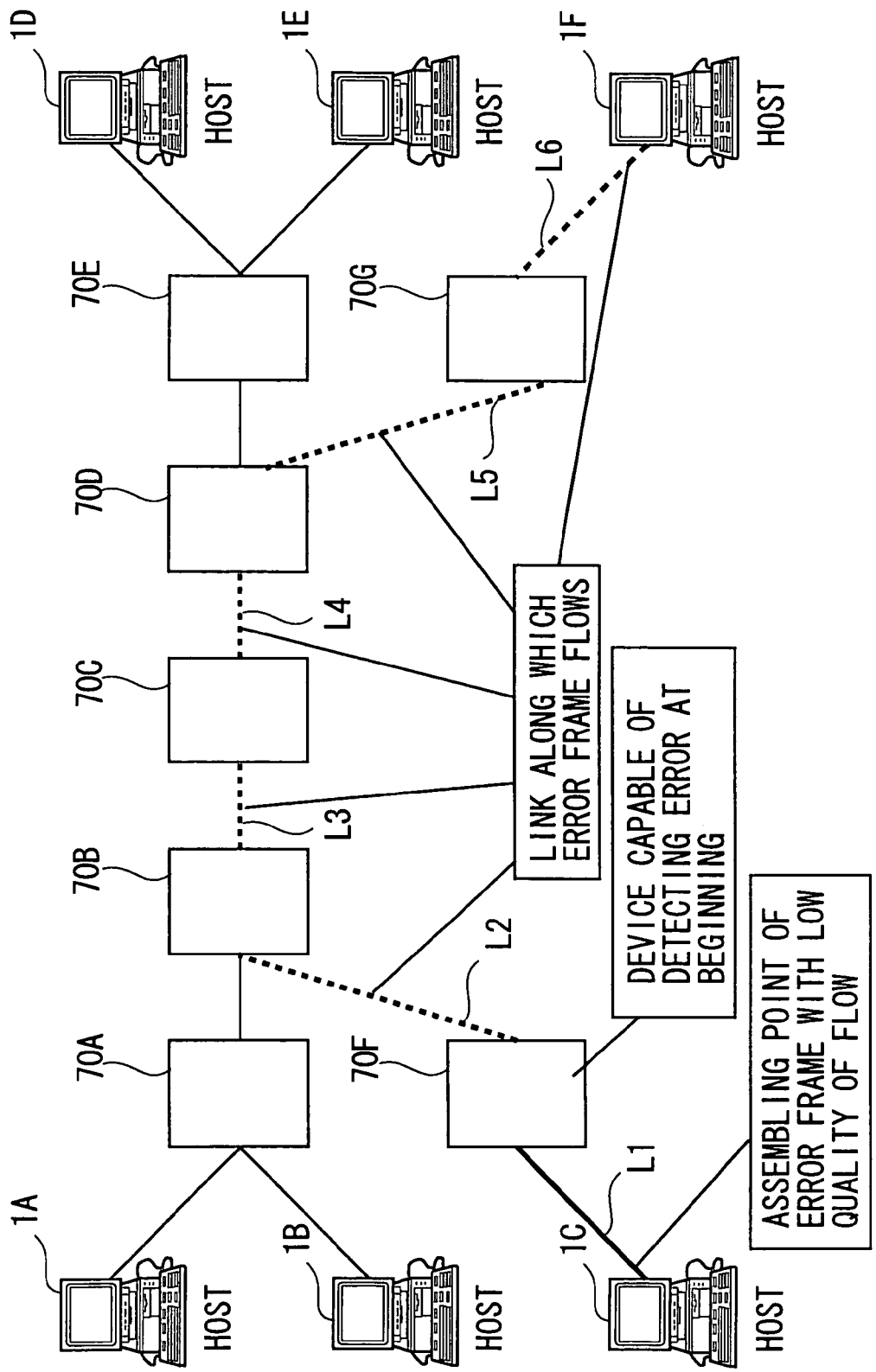
FIG. 12 is a view of a network architecture using a conventional data transfer device.

On the other hand, as illustrated in FIG. 12, in the case of the network adopting the conventional switching hubs 70A-70G, if the error occurs on the communication path L1, the switching hub 70F can detect the error, however, this error frame has already been transferred to the rear-stage device and is discarded after reaching the host 1F, and consequently the bands for the communication paths L1-L6 along which this error frame flows are wasted.

By contrast, according to the first embodiment, it does not happen that the error frame flows to the communication paths L4-L6, whereby the futile use of the bands can be prevented. Further, the throughput of the destination host 1F is not wasted.

Modified Example 1

Next, a modified example of the first embodiment will be illustrated.

The first embodiment takes the configuration that the control frame and the data frame are multiplexed, and the control frame is preferentially processed in a way that uses the same line, thereby enabling the control frame to get ahead of the data frame. The present invention is not, however, limited to this configuration, and there may also be taken such a configuration that the control frame gets ahead of the data frame by separately providing a line for transmitting the control frame and a line for transmitting the data frame and by setting a speed of the control frame line higher than the data frame line.

Figure 6:
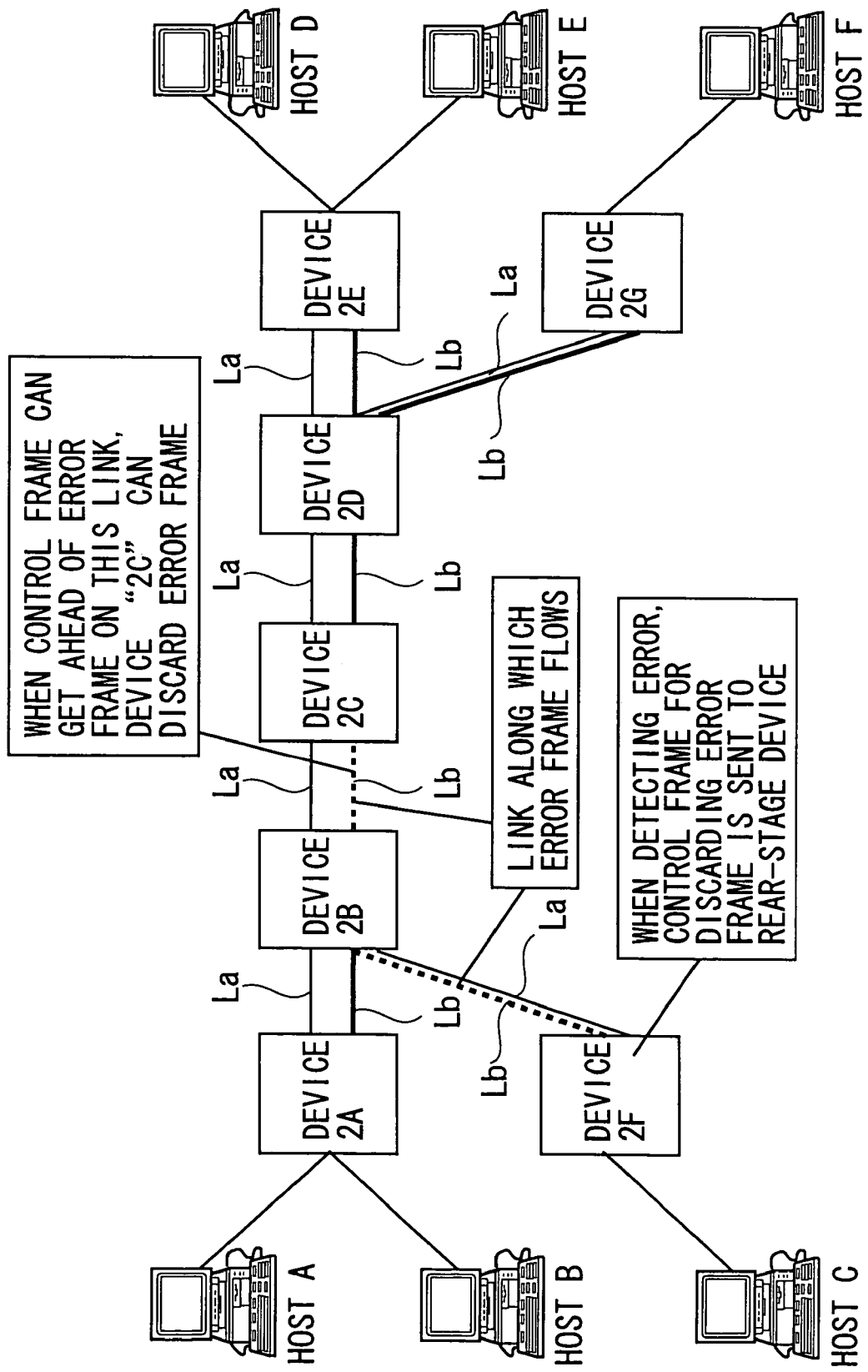
FIG. 6 is a view showing a network architecture in a first modified example.
Figure 7:
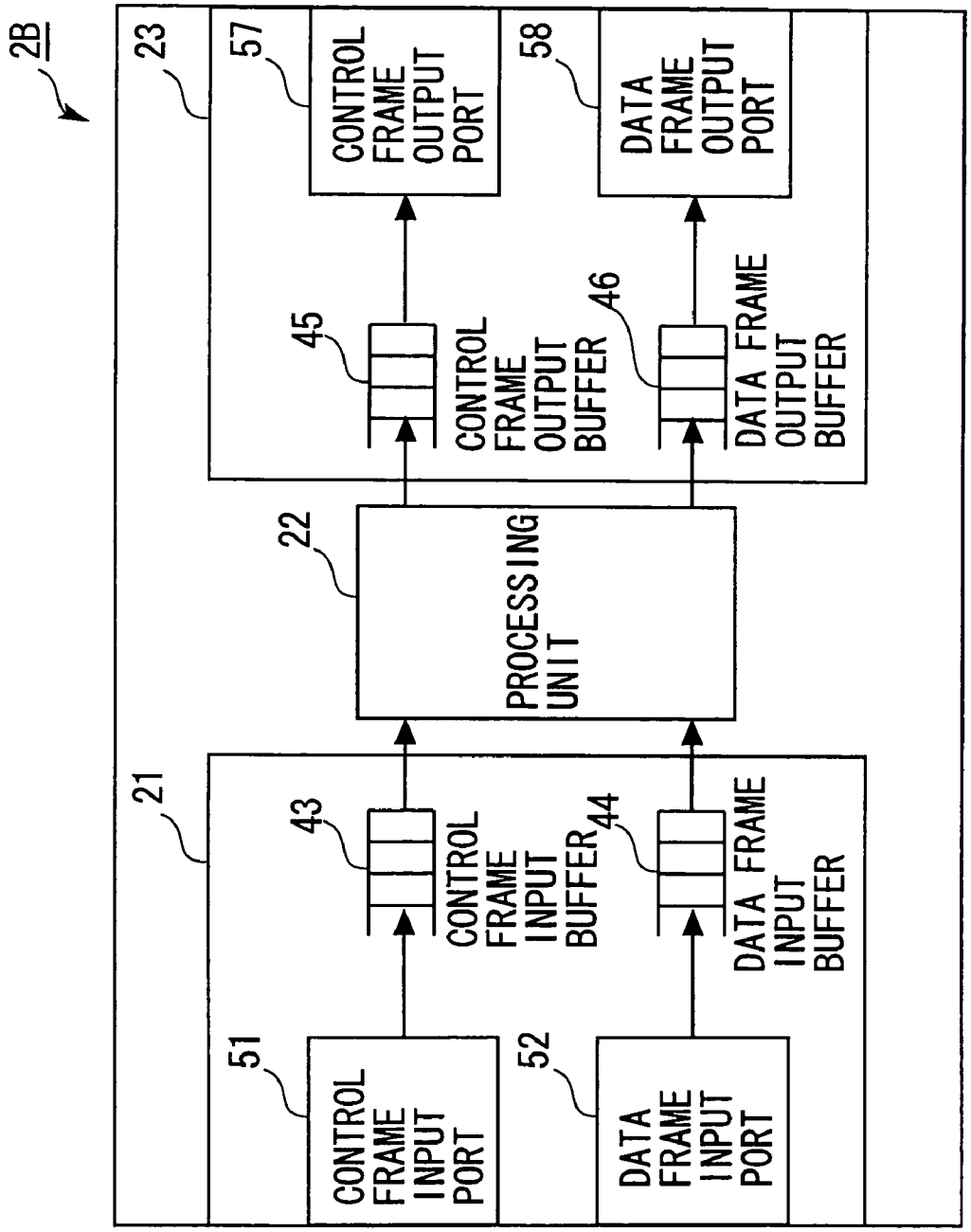
FIG. 7 is a diagram showing configurations of I/O units in the first modified example.

FIG. 6 is a view showing a network architecture in this modified example. FIG. 7 is a diagram showing configurations of the input unit and of the output unit in this modified example. The present modified example is different from the first embodiment discussed above in terms of a point that the control frame line and the data frame line are separately provided and a point that the I/O units have the different configurations from those described above, and other configurations are the same.

In this modified example, as shown in FIG. 6, a line (communication path) La for the control frame and a line Lb for the data frame are provided between the switching hubs 2A and 2G.

Moreover, the input unit 21 of the switching hub 2B in this modified example includes an input port 51 for the control frame and an input port 52 for the data frame. The input unit 21 inputs, to an input buffer 43, the control frame inputted to the input port 51 from the communication path La and inputs, to an input buffer 44, the data frame inputted to the input port 52 from the communication path Lb.

Then, the output unit 23 in the modified example stores an output buffer 45 with the control frame outputted from the processing unit 22, and thereafter outputs the control frame to the communication path La from an output port 57. Further, the data frame outputted from the processing unit 22 is stored on an output buffer 46 and thereafter outputted to the communication path Lb from an output port 58.

In this modified example, a speed of the communication path La is set higher than the communication path Lb. This scheme enables the control frame to get ahead of the data frame and enables the discard process to be executed.

The setting of the communication path La at the higher speed may also be substituted by setting a data transmission speed of the communication path La than the communication path Lb and by designing so that traffic through the communication path La is less than the traffic through the communication path Lb.

Second Embodiment

Figure 8:
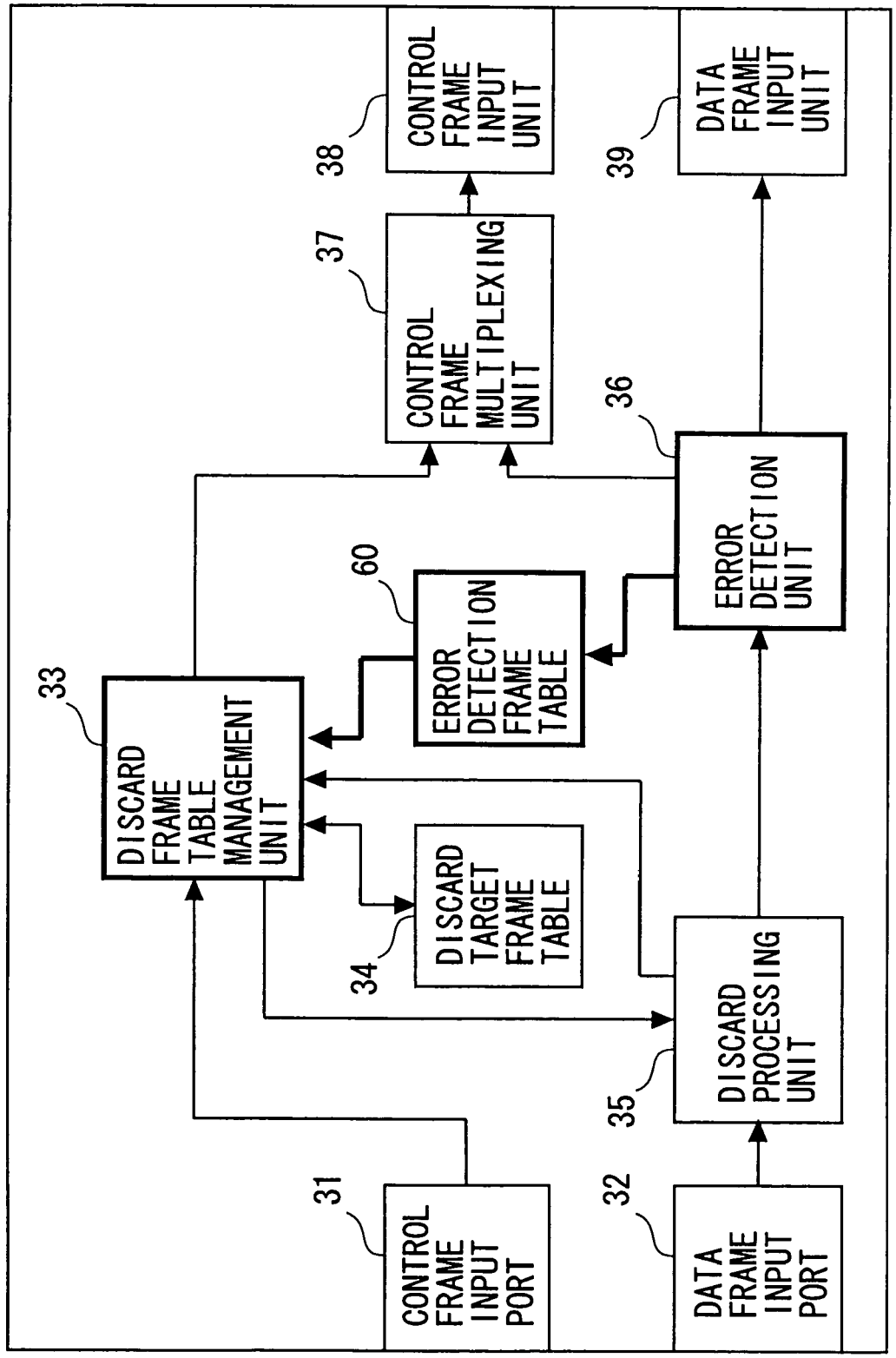
FIG. 8 is a block diagram showing a processing unit in a second embodiment.

FIG. 8 is a block diagram showing a processing unit in a second embodiment of the present invention.

The second embodiment is different from the first embodiment in terms of a point of providing and storing an error table (corresponding to an error storage module) with information about the control frame sent when detecting the error and thus preventing the control frame from being dually transmitted. Other configurations are substantially the same, and hence the repetitive explanations are omitted by marking the same components with the same numerals and symbols, and so on.

Figure 9:
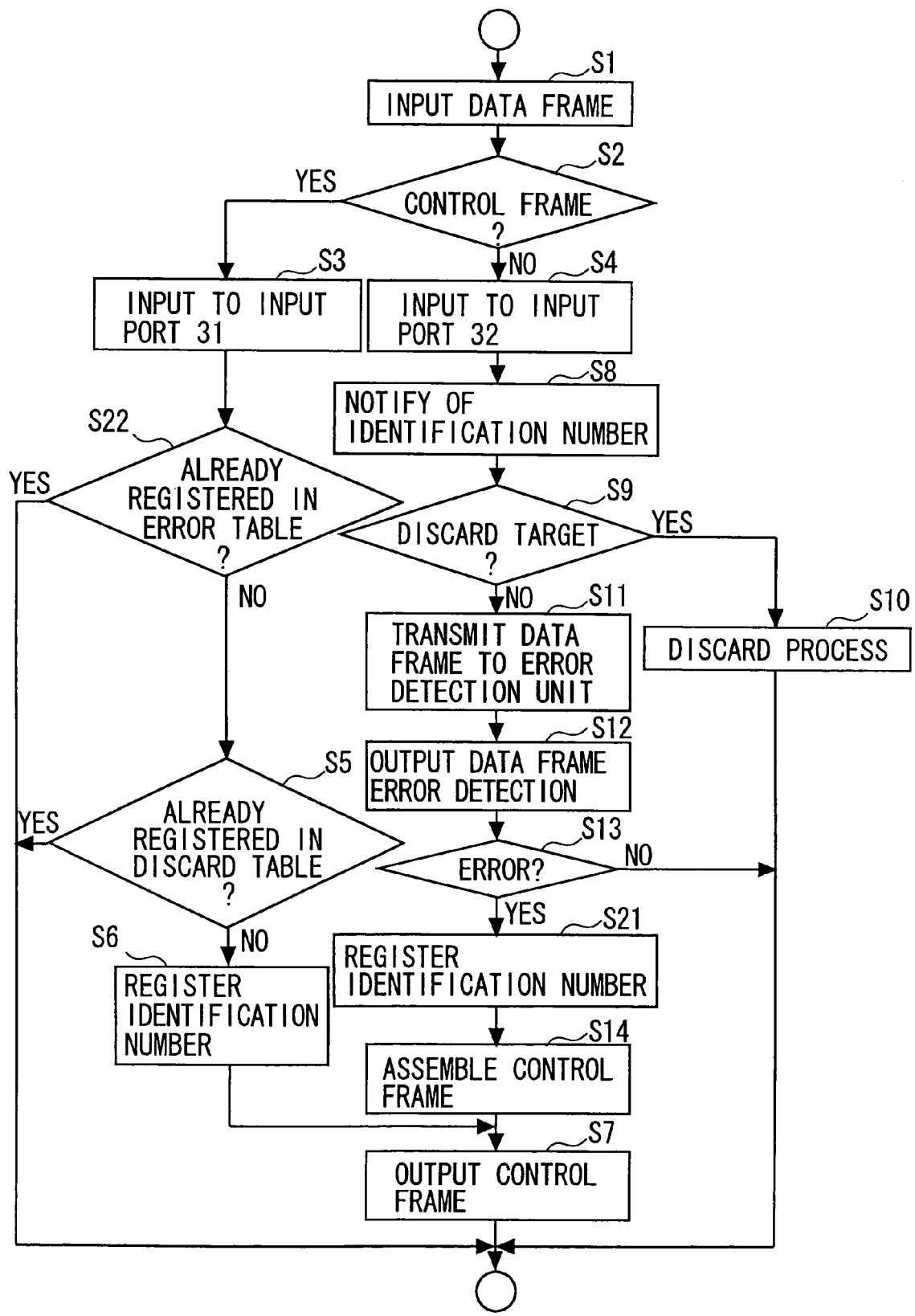
FIG. 9 is an explanatory diagram of a data transfer procedure in the second embodiment.

In the second embodiment, as shown in FIG. 9, the error detection unit 36 of the switching hub 2B, when detecting the error in step 13, writes the identification number of the error-detected data frame in an error table 60, and makes a record of detecting the error within the present device and transmitting the control frame to the rear-stage device (S21).

Further, when the control frame is inputted to the input port 31 in step 3, the table management unit 33 judges whether the identification number has already been recorded or not by searching through the error table 60 (S22). The table management unit 33 inhibits the already-registered control frame from being written in the discard target table and to be transferred to the control frame multiplexing unit.

With the configuration given above, after outputting the control frame assembled within the self-device, the control frame received from the front-stage device can be prevented from being transmitted.

Third Embodiment

Figure 10:
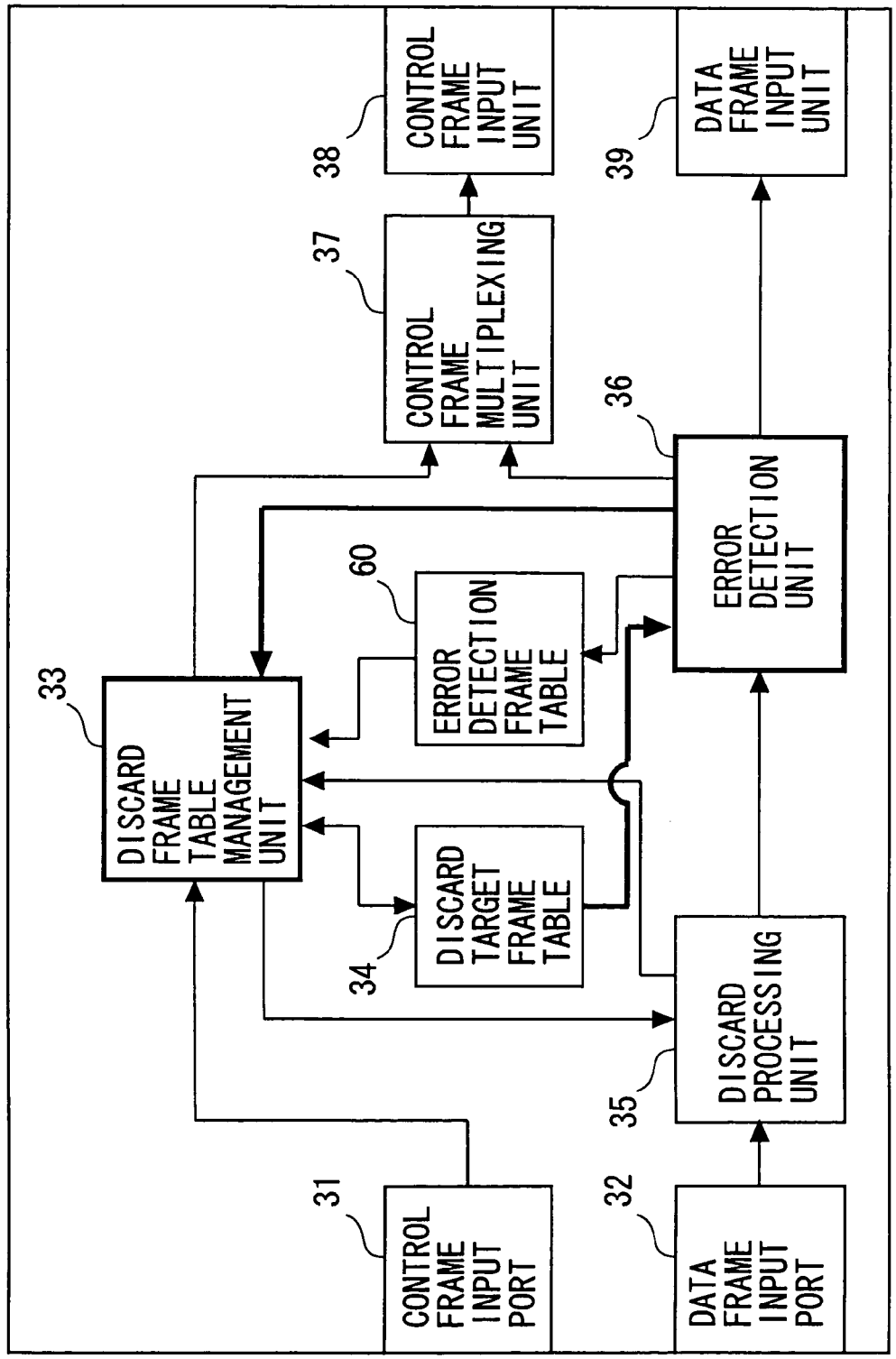
FIG. 10 is a block diagram showing a processing unit in a third embodiment.

FIG. 10 is a block diagram showing a processing unit in a third embodiment of the present invention.

The third embodiment is a more improved version of the configuration of the second embodiment, wherein a different point is that a discard target frame table is searched through when detecting the error and, if an error frame has already been recorded, the control frame is not assembled. Other configurations are substantially the same, and hence the repetitive explanations are omitted by marking the same components with the same numerals and symbols, and so on.

Figure 11:
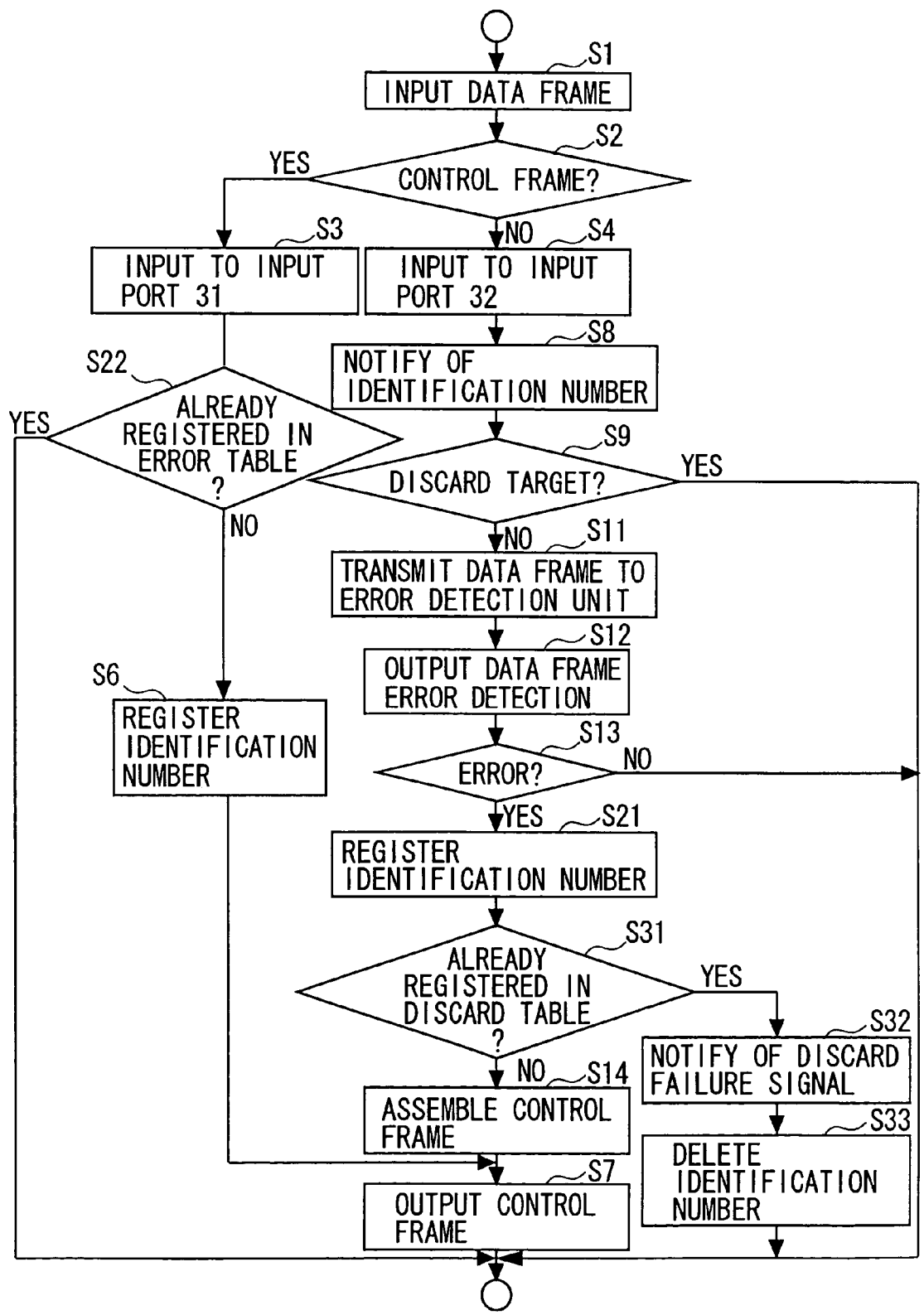
FIG. 11 is an explanatory diagram of a data transfer procedure in the third embodiment.

In the third embodiment, as shown in FIG. 11, the error detection unit 36 of the switching hub 2B, when detecting the error in step 12, before assembling the control frame, judges by searching through the discard target frame table whether an identification number of the transmitted data frame has been already recorded or not (S31), and, if already recorded, inhibits the control frame form being assembled.

Herein, the identification number being already recorded implies a state where when the error frame reaches the discard processing unit 35, the identification number of this error frame is not yet recorded in the discard target table but gets recorded during a period till the error is detected by the error detection unit 36. Namely, this is a state where a discard instruction using the control frame does not catch up with timing, and the control frame has already been transmitted to the rear-stage device.

Therefore, when the identification number has already been recorded in step 31, the error detection unit 36 notifies the table management unit 33 of a signal representing a purport (a failure of discard) that this data frame could not be discarded (S32).

The table management unit 33 deletes, based on the discard failure signal received from the error detection unit 36, the identification number of the associated data frame from the discard target table 34 (S33).

With the configuration described above, it is possible to prevent the dual transmissions of the control frame. Therefore, this eliminates the process that [the table management unit searches the discard target frame table for the already-recorded identification number] in step 5 shown in FIG. 9 in the second embodiment, whereby the control frame processing time can be reduced.

INDUSTRIAL APPLICABILITY

The embodiments discussed above have exemplified the switching hub as the data transmission device, however, the data transmission device of the present invention is not limited to the switching hub and may also be, for example, a gateway, a router, a firewall, a proxy server and so forth on condition that each of such devices includes the input unit 21, the processing unit 22 and the output unit 23.

Further, the embodiments discussed above have exemplified, as the data transmission device (the switching hub), the electronic device (the information processing device) including the respective units such as the input unit, the processing unit and the output unit that are constructed of the dedicated electronic circuits, and may also take an architecture in which the functions of the respective units are actualized by a general type of computer constructed of a CPU (Central Processing Unit), a memory and so on.

As discussed above, according to the present invention, it is feasible to discard the error frame midways of being transmitted and to prevent the futile use of the bands on the network due to the error frame or to reduce the overspending of the throughput of the destination host.

INCORPORATION BY REFERENCE

The disclosures of international application PCT/JP2003/000653 filed on Jan. 24, 2003 including the specification, drawings and abstract are incorporated herein by reference.

What is claimed is:

1. A data transfer device of a cut-through method, comprising:
an input unit accepting an input of a control frame and an input of a data frame;
a processing unit executing a transfer process of the data frame or a discard process of the data frame on the basis of the control frame inputted from said input unit; and
an output unit outputting the data frame subjected to the transfer process in said processing unit and the control frame to an outside,
wherein said processing unit includes:
a discard target storage module stored with information showing discard target data frames;
a management unit updating the information in said discard target storage module on the basis of the control frame;
a discard processing unit executing the discard process if the data frame proves to be a discard target by referring to said discard target storage module; and
an error detection unit detecting an error of the data frame, and when the data frame is an error frame containing an error, said error detection unit detects the error, assembles a new control frame showing a purport that the error frame is to be discarded, and outputs the new control frame to the outside from said output unit.

2. The data transfer device according to claim 1, wherein said management unit searches for the information registered in said discard target storage module and, when judging that a content to be updated based on the control frame has already been registered, inhibits the information from being updated and the control frame from being outputted to the outside.

3. The data transfer device according to claim 1, wherein the information in said discard target storage module is deleted after a predetermined period of time has elapsed.

4. The data transfer device according to claim 1, wherein said error detection unit includes an error storage module recorded with, when detecting the error and outputting the new control frame, information about this outputted control frame.

5. The data transfer device according to claim 1, wherein
said error detection unit includes an error storage module recorded with, when detecting the error and outputting the new control frame, information about this outputted control frame, and,
said processing unit, when updating said discard target storage module on the basis of the control frame, searches for the information registered in said error storage module and, when judging that a content to be updated has already been registered, inhibits the information from being updated and the control frame from being outputted to the outside.

6. The data transfer device according to claim 1, wherein:
said error detection unit includes an error storage module recorded with, when detecting the error and outputting the new control frame, information about this outputted control frame, and
when said error detection unit detects an error, said discard target storage module is searched through, and, when judging that the error-detected data frame has already been registered as a discard target, the error is inhibited from being stored in said error storage module.

7. The data transfer device according to claim 1, wherein when said error detection unit detects an error, a discard target storage module stored with information showing discard target data frames is searched through, and, when judging that the error-detected data frame has already been registered as a discard target, the information about the discard target is deleted from said discard target storage module.

8. The data transfer device according to claim 1, wherein a process of outputting the control frame is executed preferentially over a process of outputting the data frame.

9. The data transfer device according to claim 8, wherein said input unit accepts an input of the data frame and an input of the control frame from the same communication path, and said output unit outputs the data frame and the control frame to the said communication path.

10. The data transfer device according to claim 9, wherein when said input unit accepts an input of the data frame and an input of the control frame respectively from the communication paths different from each other and when said output unit outputs the data frame and the control frame respectively to the communication paths different from each other, a speed of the communication path for the control frame is set higher than that of the communication path for the data frame.

11. The data transfer device according to claim 1, wherein said processing unit staffs outputting the data frame before reading the whole data frame.

12. A data transfer cut-through method executed by an information processing device, comprising:
a step of accepting an input of a control frame;
a step of accepting an input of a data frame;

a step of executing a transfer process of the data frame or a discard process of the data frame on the basis of inputted the control frame;

a step of executing the discard process of, when the data frame proves to be a discard target by referring to a discard target storage module stored with discard target data frames, discarding this data frame;

a step of detecting an error of the data frame;

a step of assembling, when the data frame is an error frame containing an error, a new control frame showing a purport that the error frame is to be discarded;

a step of outputting the new control frame to an outside; and a step of outputting the data frame subjected to the transfer process to the outside.

13. The data transfer method according to claim 12, further comprising a step of searching for the information registered in said discard target storage module and, when a content to be updated based on the control frame has already been registered, inhibiting the information from being updated and the control frame from being outputted to the outside.

14. The data transfer method according to claim 12, further comprising a step of deleting the information in said discard target storage module after a predetermined period of time has elapsed.

15. The data transfer method according to claim 12, further comprising a step of storing, when detecting the error and outputting the new control frame, an error storage module with information about this outputted control frame.

16. The data transfer method according to claim 12, further comprising a step of storing, when detecting the error and outputting the new control frame, an error storage module with information about this outputted control frame, wherein when updating said discard target storage module on the basis of the control frame, the information registered in said error storage module is searched for, and when judging that a content to be updated has already been registered, the updating of the information and the outputting of the control frame to the outside are inhibited.

17. The data transfer method according to claim 12, further comprising a step of storing, when detecting the error and outputting the new control frame, an error storage module with information about this outputted control frame, wherein when detecting an error, said discard target storage module is searched through, and when judging that the error-detected data frame has already been registered as a discard target, the error is inhibited from being stored in said error storage module.

18. The data transfer method according to claim 12, wherein when detecting an error, a discard target storage module stored with information showing discard target data frames is searched through, and when judging that the error-detected data frame has already been registered as a discard target, the information about the discard target is deleted from said discard target storage module.

19. The data transfer method according to claim 12, wherein a process of outputting the control frame is executed preferentially over a process of outputting the data frame.

20. The data transfer method according to claim 12, wherein the output of the data frame is started before reading the whole data frame.

* * * * *